United States Patent [19]

Adams

[11] Patent Number: 5,281,458
[45] Date of Patent: *Jan. 25, 1994

[54] SUNLIGHT REFLECTOR

[76] Inventor: Thomas M. Adams, 10430 Grand Park, San Antonio, Tex. 78239

[*] Notice: The portion of the term of this patent subsequent to Apr. 25, 2008 has been disclaimed.

[21] Appl. No.: 69,877

[22] Filed: Jul. 6, 1987

[51] Int. Cl.$^5$ .................. B32B 3/06; B32B 3/10; B32B 27/08; B32B 27/36
[52] U.S. Cl. .................. 428/100; 428/131; 428/134; 428/458; 428/480
[58] Field of Search ........... 428/100, 131, 136, 480, 428/458, 12, 132, 134; 296/97 H, 95 C, 97 E

[56] References Cited

U.S. PATENT DOCUMENTS

| | | | |
|---|---|---|---|
| 4,209,197 | 6/1980 | Fischer | 428/100 X |
| 4,666,760 | 5/1987 | Hasuda et al. | 428/458 X |
| 4,690,446 | 9/1987 | Warren | 428/100 X |
| 4,751,115 | 6/1988 | Smith et al. | 428/12 |

Primary Examiner—Thomas J. Herbert
Attorney, Agent, or Firm—Cox & Smith Incorporated

[57] ABSTRACT

A sunlight reflector for vehicles includes a first layer of polyester film having a reflectively coated side and a non-reflectively coated side; a second layer of polyester film adjacent said first layer and adherently joined to said first layer at intervals, and "VELCRO" hooks and loops for attachment of the sunlight reflector to the inside of a vehicle.

10 Claims, 1 Drawing Sheet

SUNLIGHT REFLECTOR

BACKGROUND OF THE INVENTION

On hot sunny days, especially in the Southern states, the interior of a vehicle left sunny parking area can become very hot in a short time. Because of the green house effect, interior automobile temperatures of as much as 140° Fahrenheit are achieved frequently. This extreme heat causes accelerated deterioration of vehicle interiors, instrumentation, audio components and, often times, to items left in the car.

A driver returning to a sun-heated vehicle may at times be unable to touch metal parts of the vehicle without suffering burned hands. Even the metallic portions of seatbelts may be so hot they cannot be touched and secured about the driver or passengers. In some vehicles a hydrocarbon vapor residue from over-heated interior components deposits on the insides of the automobile windows, forming a film which can be very difficult to remove from the windows and which is detrimental to visibility.

Accordingly, a need has arisen for an efficient, effective means for reflecting solar energy from the glass windows of an automobile parked in the sunlight.

It is an object of the present invention to provide a reflecting means which is efficient and effective for reflecting sunlight from automobile windows.

Another object of the present invention is to provide a sunlight reflector which can be quickly and easily secured within a car window before leaving the car parked in a sunny location.

A further object of the present invention is to provide a sunlight reflector which can be used as an emergency blanket if needed, to reflect heat inwardly when secured around a person in need of protection from cold.

Yet another object of the present invention is to provide a sunlight reflector which can be adapted for use in vehicles of all sizes, configurations and types.

These and other objects, features and advantages of the invention will become evident in light of the following detailed description.

SUMMARY OF THE INVENTION

A sun reflector is provided, comprising a first layer of polyester film having a reflectively coated side and a non-reflectively coated side; a second layer of polyester film adjacent said first layer and adherently joined to said first layer at intervals, and means for releasable attachment of the sun reflector within a vehicle window.

DETAILED DESCRIPTION OF THE DRAWINGS

Figure 1:
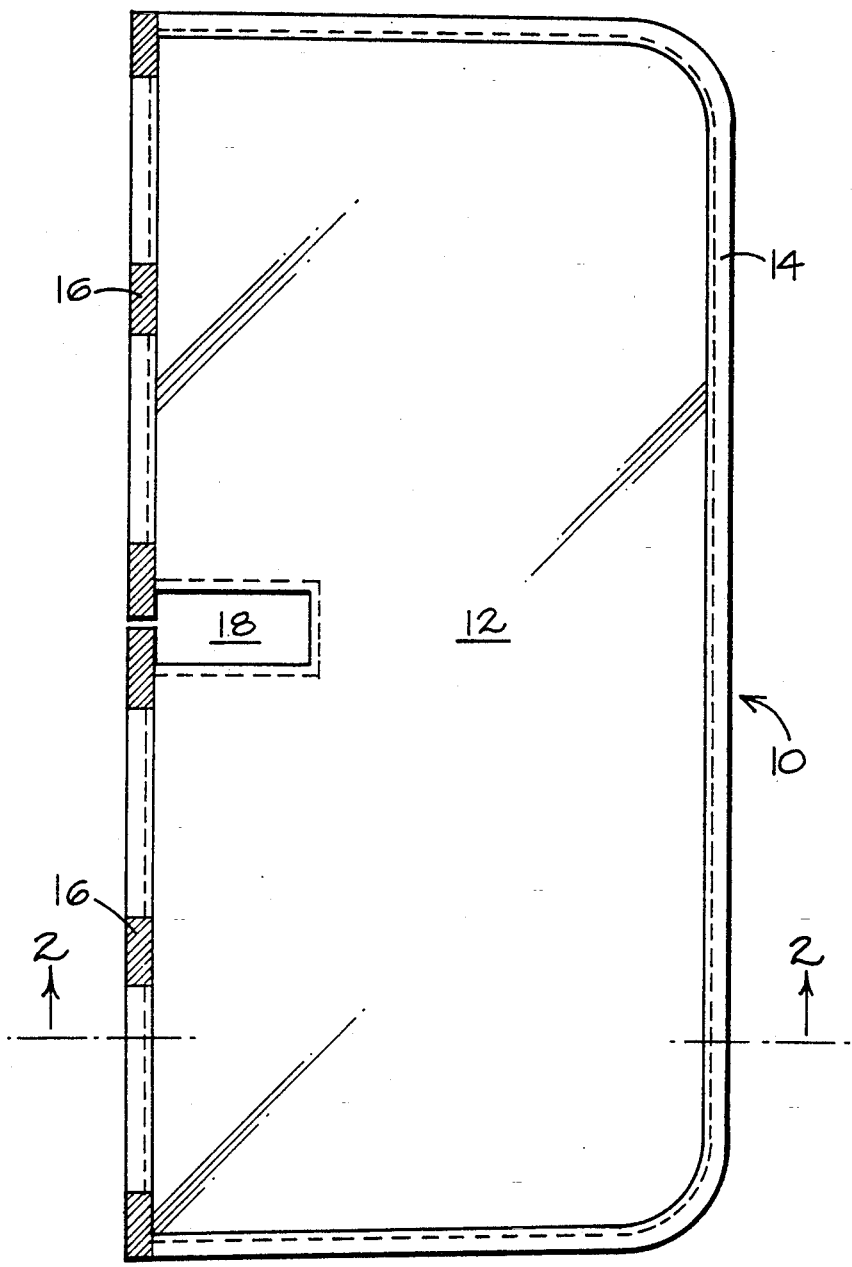
FIG. 1 is a top plan view of the apparatus of the present invention.
Figure 2:
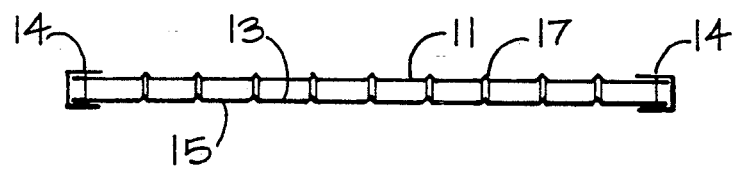
FIG. 2 is a section view along lines 2—2 of FIG. 1.

A sunlight reflector constructed according to the teachings of the present invention is designated generally at reference numeral 10. A large reflective shield 12 comprises a clear polyester protective layer of film 11 over a silver-coated reflective layer of polyester film 13 having a silvery reflective side and a non-reflective backside 15. The layers can be heat-embossed together as at 17 to form a "quilted" pattern as shown in FIG. 2. One such material constructed in this manner is commercially available under the brand name "Mylar", and is manufactured by E. I. DuPont de Nemours Co., Wilmington, Del. 19898.

Edges of reflective shield 12 are reinforced and protected by an over-stitched band 14 of reinforcing material such as urethane coated nylon or other suitable material as is known in the art. A plurality pieces 16 of "VELCRO" loop material are integral with reflective shield 12 and band 14 and are positioned at chosen spaced intervals along the perimeter of shield 12.

Means for accommodating a rear-view mirror (not shown) is also provided, which accomodating means comprises an aperture 18 within reflective shield 12. Aperture 18 is provided for fitting reflective shield 12 around a shaft supporting the rear-view mirror by slidably receiving said rear-view mirror therein. To use the invention as a sunlight reflector, a plurality of pieces of "VELCRO" hook material (not shown) are attached at intervals to the frame adjacent a window of a car on the interior of the car for releasably mating with the "VELCRO" loops integral with reflector shield 12. The reflector shield 12 is releasably secured within the interior window space of the car by releasably mating the "VELCRO" hook material with the "VELCRO" loop material. The silvery reflective side is faced outward, and the non-reflective side is faced inward.

The sunlight reflector constructed according to the teachings of the present invention can be constructed for use in any size or configuration of vehicle or other type window. The sunlight reflector also has numerous other utilitarian functions. The invention, when not in use, can also function as an emergency blanket for concentrating body heat inwardly, a wind break, a sunshade, or a tent.

Although the invention has been described in conjunction with the foregoing specific embodiment, many alternatives, variations, and modifications are intended to fall within the spirit and scope of the following claims.

What is claimed is:

1. A sunlight reflector for minimizing the passage of solar radiation to the interior of an enclosure having a window, comprising:
   a first layer of polyester film having a reflective side and a non-reflective side;
   a second layer of polyester film joined to said first layer to form a reflective material;
   securing means integral with said reflective material for releasably securing said reflective material adjacent a window of an enclosure; and
   means attached to the interior of the enclosure for releasably mating with said securing means.

2. The sunlight reflector of claim 1 wherein said mating means comprises "VELCRO" hook material attached to the frame adjacent the window, and said securing means comprises "VELCRO" loop material integral with said reflective material.

3. The sunlight reflector of claim 1 additionally comprising reinforcing means integral with said reflective material at the perimeter thereof.

4. The sunlight reflector of claim 1 additionally comprising grommets at corners of said reflective material, for receiving string or other fastening means therein to enable use of said reflective material as an emergency blanket, windbreak, sunshade, or tent.

5. The sunlight reflector of claim 1 additionally comprising means for accomodating a rear-view mirror connected to the window.

6. The sunlight reflector of claim 5 wherein said accomodating means comprises an aperture within said sunlight reflector for slideable reception of said rear-view mirror therein.

7. The sunlight reflector of claim 1 wherein said reflective material is adapted for fitting said reflective material around a rear-view mirror connected to the window.

8. The sunlight reflector of claim 7 wherein said reflective material has an aperture therethrough for fitting said reflective material around a rear-view mirror connected to the window.

9. A sunlight reflector for minimizing the passage of solar radiation to the interior of an enclosure having a window comprising:

a first layer of polyester film having a reflective side and a non-reflective side;

a second layer of polyester film joined to the reflective side of said first layer to form a reflective shield, said second layer being a clear layer;

securing means integral with said reflective shield for releasably securing said reflective shield to mating means; and mating means attached to an interior of an enclosure adjacent a window thereof for releasably mating with said securing means.

10. The sunlight reflector of claim 9, wherein:

said securing means comprises a plurality of pieces of "VELCRO" loop material spaced at intervals along the perimeter of said reflective shield; and said mating means comprises a plurality of pieces of "VELCRO" hook material attached at intervals to a frame adjacent a window of said enclosure on the interior thereof.

* * * * *